June 19, 1928.

J. D. NIXON ET AL

DRILL STEM

Filed April 27, 1926

1,674,055

Inventor
Jeddy D. Nixon
Margid Manning
Hardway Cathey

By

Attorney

Patented June 19, 1928.

1,674,055

UNITED STATES PATENT OFFICE.

JEDDY D. NIXON AND MARGIA MANNING, OF HOUSTON, TEXAS.

DRILL STEM.

Application filed April 27, 1926. Serial No. 104,953.

This invention relates to new and useful improvements in a drill stem.

One object of the invention is to provide a drill stem equipped with a blow out safety valve, whereby the water course through the stem may be closed, to prevent a blow out of gas through the stem. In oil well drilling, gas, under pressure, is often encountered and unless the water passageway is closed, in such event, the gas will escape through said stem with great force and will carry mud and slush with it up through the stem and injure the drilling equipment and endanger the workmen. When the stem is equipped with the safety valve described, if gas be encountered the conventional blow out preventer, around the stem, may be closed thus preventing the escape of gas around the stem, and the safety valve, hereindescribed, also closed and the escape of gas from the well thus entirely prohibited.

Another object of the invention is to provide a safety valve which may be readily incorporated into, or removed from, the stem, and which may be easily opened or closed to control the passageway through the stem.

With the above and other objects in view this invention has particular relation to certain novel features of construction, operation and arrangement of parts, an example of which is given in this specification and illustrated in the accompanying drawings, wherein:—

Figure 1:
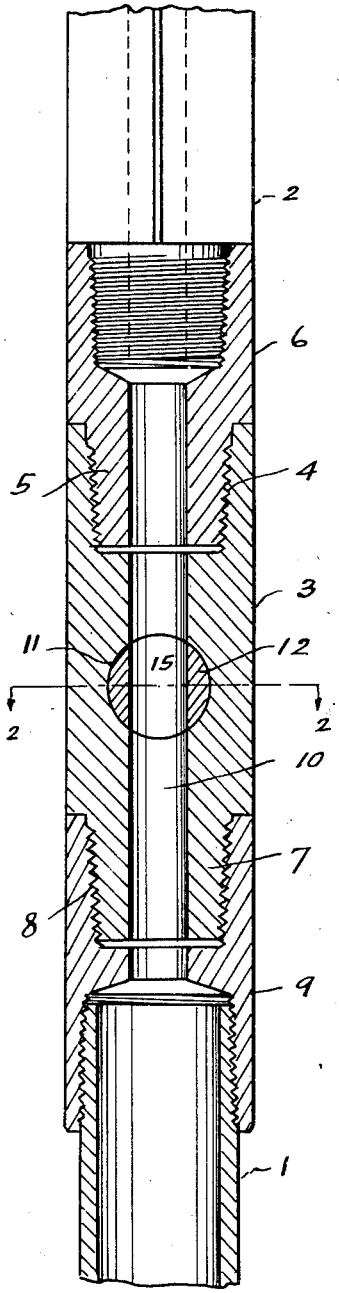
Figure 1 shows a fragmentary vertical sectional view of a drill stem showing the safety valve incorporated therein.
Figure 2:
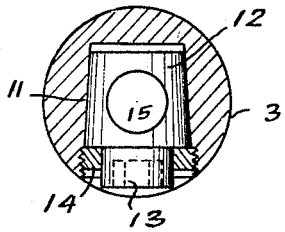
Figure 2 shows a cross sectional view taken on the line 2—2 of Figure 1.
Figure 3:
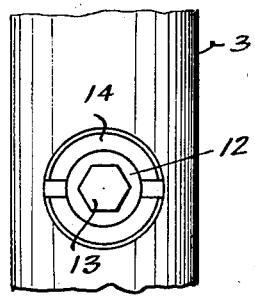
Figure 3 shows a fragmentary side view thereof.

Referring now more particularly to the drawings wherein like numerals of reference designate similar parts in each of the figures the numeral 1 designates a drill pipe or stem and the numeral 2 designates the kelley joint, or grief pipe, forming the upper joint of the stem and which is operatively connected with the rotary in drilling.

There is a tubular insert 3, forming a valve casing, incorporated into the stem and connecting the kelley joint onto the stem proper.

This valve casing has the flared internally threaded box 4, at its upper end to receive the pin 5 of the coupling 6 into the upper end of which the lower end of the kelley joint is threaded.

The lower end of the casing 3 has a reduced, tapered outwardly threaded pin 7 which is screwed into the tapering, internally threaded box 8 of the coupling 9, which is connected to the upper end of the drill pipe, or stem 1.

The casing 3 has a vertical water course 10, which continues from end to end of the stem, and is formed with an outwardly flared valve seat 11, circular in cross section, in which the rotatable valve 12 is seated. The outer end of this valve is reduced and formed with a polygonal end socket 13 and around said reduced end there is a ring nut 14 which is threaded into the outer end of the valve seat to retain the valve in place. The valve 12 has an opening 15 which normally registers with the water course 10 through the stem.

In case gas is encountered in drilling, a wrench may be inserted into the socket 13 and the valve 12 turned to bring the opening 15 out of registration with the passageway 10 and said passageway thereby blocked to prevent the escape of gas through the stem.

What we claim is:

1. In combination a tubular drill stem and a tubular kelley joint forming the upper end thereof, of a tubular insert whose upper end is formed with an internally threaded box and whose lower end is formed with an externally threaded pin, a tubular coupling having an externally threaded pin at one end adapted to be screwed into said box and having an internally threaded box at its other end adapted to receive an externally threaded pin on said kelley joint, a tubular coupling, one end of which is connected to the adjacent section of the drill stem and whose other end is formed with an internally threaded box adapted to receive the pin of said insert, said insert being provided with a transverse socket extending only partly therethrough and which is outwardly flared forming a valve seat circular in cross section, a rotatable valve fitted snugly into said seat whose inner end is spaced from the inner end of said socket and whose outer end is substantially flush with the external surface of said insert, said valve having an opening extending transversely with respect to the axis of the valve and which is adapted, to be brought into and out of registration with the water course through the stem by rotating said valve.

2. In a drill stem adapted to be rotated in a well bore, a joint member having a smooth external surface, and adapted to be connected into said stem and having an axial fluid passageway therethrough and having a transverse socket forming a valve seat extending only partially through said joint member, a rotatable valve in said seat having an opening adapted to be brought into and out of registration with said passageway, as the valve is turned, said valve being contained wholly within said member thus adapting said member for connection into said drill stem and the inner end of the valve being spaced from the inner end of the socket.

In testimony whereof we have signed our names to this specification.

JEDDY D. NIXON.
MARGIA MANNING.